FIG. I.

INVENTORS.
ROBERT J. FLAHERTY, JR.
WATT V. SMITH
ATTORNEYS

INVENTORS
ROBERT J. FLAHERTY, JR.
WATT V. SMITH
BY
ATTORNEYS

United States Patent Office 3,143,972
Patented Aug. 11, 1964

3,143,972
AXIAL FLOW UNIT
Watt V. Smith, 315 Old County Road, Severna Park, Md., and Robert J. Flaherty, Jr., 632 Binsted Road, Glen Burnie, Md.
Filed Feb. 6, 1963, Ser. No. 256,773
11 Claims. (Cl. 103—87)
(Granted under Title 35, U.S. Code (1952), sec. 266)

The invention described herein may be manufactured and used by or for the Government of the United States of America for governmental purposes without the payment of any royalties thereon or therefor.

This invention relates to an axial flow unit and more particularly it relates to a motorized unit adapted to be immersed in or connected to a fluid source to propel fluid from the source axially through the unit.

When an axial flow unit, of the type having fixed and rotatable blade members concentric about the unit axis, is operated in a surrounding ambient fluid medium, particularly a non-compressible fluid medium, the fluid flows axially through the unit. If the unit is unrestrained from movement, the vectorial axial force created by the fluid as it discharges from the unit will cause an equal and opposite axial thrust force tending to propel the unit axially through the fluid medium. Thus, the unit in its axially unrestrained state acts as a propulsive device of reaction type. If the unit is restrained from movement, as by mounting it, it will act as a pump to pump the fluid axially therethrough.

In the conventional form of axial flow equipment, the fluid blades are attached to the casing and the movable blades are attached to a rotatable axial shaft. As the shaft is rotated, the ambient fluid flows axially between the casing and the shaft. Equipment of this type requires a motor or other prime mover to rotate the shaft, and bearings of some type must be employed to axially position the shaft. In addition to the problems of increased size and weight due to the separate motor, conventional equipment of this type also has numerous problems associated with the bearings such as cleaning, lubricating, replacement and the like. Recently, the present inventors solved most of the problems associated with the bearings by inventing an electric motor which dispensed with the conventional shaft and shaft bearings, but retained their function. This was accomplished by developing a hydrodynamic film of ambient fluid between the rotor and stator elements during operation of the motor. This particular electric motor is the subject matter of patent application Serial No. 225,943, filed September 24, 1962, in the name of the present inventors.

The present invention contemplates the use of an electric motor embodying the principles of the above-mentioned application to operate an axial flow device which has as one of its objects, the provision of a compact unit having internal impeller means adapted to operate in a liquid medium to axially impel a portion of the liquid through the unit.

Another object of the present invention is to provide an axial flow unit having an integral motor with rotor and stator portions having smooth coacting surfaces which act as supporting and positioning elements for each other thus eliminating the need for separate bearings.

A further object of the present invention is to provide an axial flow unit having a rotatable impeller means concentric about the unit axis which, in operation, forces the ambient fluid through the unit and discharges the fluid in an accelerated state, thus causing an equal and opposite thrust on the unit which propels the unit through the ambient fluid when the unit is unrestrained from movement.

Yet another object of the present invention is to provide a liquid propulsion device in which the motor and the flow producing impellers are connected to form a single axial flow unit in which the critical interior working parts are suitably embedded in a liquid-impervious material so that the entire unit is capable of being submerged in the liquid, and in which the liquid is permitted to circulate through the interior of the unit thus lubricating and cooling the same, permitting it to operate with higher electrical currents, reducing the noise generated by its operation, and eliminating the need for sealing elements, liners, and the like which previously were needed to protect the interior of such a unit from deleterious effects of the liquid flowing through the unit.

Still a further object of the present invention is to provide an axial flow unit which has means for distributing a part of the fluid through the interior of the unit to cool and lubricate the same, and which also has means for separating such fluid so only clean, dirt-free fluid is used in lubricating the unit.

Other objects, advantages and salient features of the present invention will become apparent from the following description, taken in connection with the accompanying drawings, which illustrate a preferred embodiment, in which.

Figure 1:
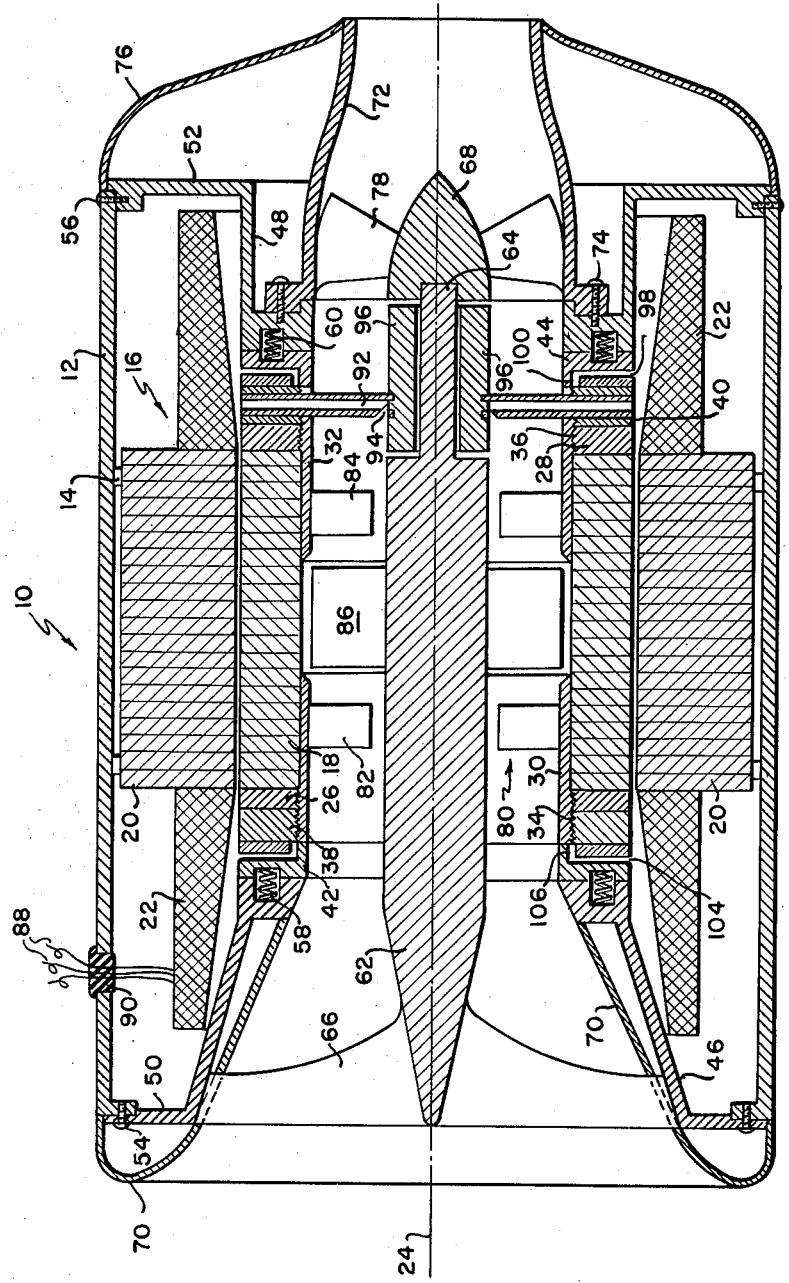
FIG. 1 is a transverse sectional view of an axial flow unit in accordance with the present invention, in which the unit is unrestrained from movement and is thus adapted to act as a propulsive device.

Referring to the drawings and particularly FIG. 1, the unit, which is generally indicated at 10, is contained with a hollow casing member 12. An electric induction motor is fixedly mounted within the casing 12 by means of segmental spacers 14 which space the motor slightly away from the interior casing walls to provide cooling passages or spaces.

The motor is comprised of a stator member, generally indicated at 16, and a rotor member 18. The stator member 16 includes a laminated core structure 20 and field windings 22, both of conventional electric motor type, preferably three phase. The stator is provided with a central internal cylindrical bore in which the rotor 18 is freely mounted. The rotor 18 is of the conventional laminated induction type, and is provided with a central internal cylindrical bore. The rotor 18, the rotor bore, and the stator bore are all coaxial along the axis of rotation of the unit 10, this axis being identified by the reference numeral 24.

The outer surface of the rotor 18 and the inner surface of the stator 16, as defined by the walls of the stator bore, comprise the complemental working surfaces of the motor and, as such, are mating and coacting substantially smooth continuous surfaces, with the outer diameter of the rotor 18 being very slightly smaller than the diameter of the stator bore, to thereby provide an annular clearance region between the stator and the rotor.

For operation while immersed in liquids, the stator and rotor elements are coated or encapsulated in epoxy resin or other suitable material to render them impervious and inert to the deleterious effects of the surrounding liquid. The stator member and the rotor member are embedded separately and are completely surrounded and encased by the material, after which the stator bore surface and the rotor outer surface are properly machined and polished to provide a clearance therebetween equivalent to that normally utilized in a normal journal bearing, which is 0.001 to 0.003 inch of clearance per inch of rotor diameter. A specific coating and an encapsulation process have been disclosed in applicants' copending application Serial No. 225,943, filed September 24, 1962, and a model of a motor treated in such a manner has been operated in sea water for long periods of time without suffering any adverse effects.

The rotor member 18 is provided with a pair of integral end rings 26 and 28 which are internally threaded to receive a pair of hollow tubes 30 and 32. The hollow tubes extend partially into the rotor bore, and that portion of the tubes which remains outside the rotor bore is externally threaded, at 34 and 36 respectively, to provide means for attaching the tubes to the rotor end rings so that rotation of the rotor 18 will cause a corresponding rotation of the tubes 30 and 32.

Thrust bearing means are provided at each end of the rotor member 18 to maintain axial positioning thereof and to balance the axial or endwise thrust forces which may occur during operation, or upon energization or more particularly upon de-energization of the motor. The thrust bearings include a pair of annular, internally threaded thrust runners 38 and 40 which are attached, respectively, to the externally threaded portions 34 and 36 of the hollow tubes 30 and 32. In addition to their primary function as a part of the thrust bearings, the thrust runners 38 and 40 also act as lock nuts to prevent loosening of the tubes 30 and 32, during operation. The thrust bearings also include a pair of annular bearing members or thrust shoes 42 and 44, which mate, respectively, with the thrust runners 38 and 40. The mating surfaces between the thrust shoes and the thrust runners form the bearing surfaces of the thrust bearings, and, as such, should be smooth and substantially flat.

The thrust shoes 42 and 44 are supported by cup-shaped end plate members 46 and 48, respectively, and, if desired, can be sealed thereto by rubber sealing rings or the like. The end plates 46 and 48 have lateral flange portions 50 and 52, respectively, which are mounted to the casing 12 by a plurality of bolts 54 and 56, respectively, or other suitable mounting means. A plurality of coil compression springs 58 are interposed in mating cavities between the end plate 46 and the thrust shoe 42, and a plurality of coil compression springs 60 are interposed in mating cavities between the end plate 48 and the thrust shoe 44. The springs 58 and 60 provide a compressive force to force the thrust shoes toward the thrust runners, provide a means to accommodate angular misalignment of the rotor if such should occur, and provide a means for preventing rotation of the thrust shoes. Thus, the thrust shoes are maintained substantially stationary while the thrust runners rotate in unison with the rotor member 18. When fluid is introduced between the thrust shoes and the thrust runners, in a manner as will be presently described, the relative rotation between these members causes a hydrodynamic film of the fluid to be created in each thrust bearing, and this film counteracts the thrust loading in a manner well-known in the bearing art.

The unit is provided with a central shaft, coaxial with the axis of rotation 24, and having a main portion 62 and a diametrically reduced stem portion 64. The shaft is supported and positionally maintained in a stationary, non-rotary manner, by attaching the main portion 62 to a plurality of strut members 66, and attaching the reduced portion 64 to a hub member 68. The strut members 66 are attached at one end to the shaft 62 and at their other end to the end plate 46, by suitable attachment means, such as welding. Though the unit can actually be operated bi-directionally, that is, with flow through the unit in either direction, the best results are achieved with the inlet at the end with the strut members 66, and the outlet at the opposite end.

The inlet end, as shown in FIG. 1, can be provided with a surface of revolution or cowling 70, preferably designed to obtain a maximum ram effect from movement of the unit through the ambient fluid, without suffering any shock losses. The cowling 70 is suitably attached, as by welding, brazing, or a plurality of small screws, to the outer edge of the flange 50 and the inner part of the end plate 46. The outlet end of the unit is provided with a streamlined flow nozzle 72 which is suitably attached to the end plate 48, either by a plurality of bolts 74, or some other suitable fastening means. A cowling 76, to minimize flow losses around the outside of the unit 10, is suitably attached between the outer edge of the flange 52 and the outer end of the nozzle 72. A plurality of straightening blades or vanes 78, the purpose of which will be presently described, are suitably affixed, as by brazing, welding, or cementing, at their outer ends to the nozzle 72 and at their inner ends to the hub member 68, thus fixedly positioning said hub member.

The propulsive effect is produced by an axial flow impeller assembly, generally designated 80. A plurality of impeller blades 82 of conventional airfoil-type design, are attached to the inside of the hollow tube 30, by welding, brazing, cementing or other suitable joining methods. A similar set of impeller blades 84 are attached to the inside of the hollow tube 32. A plurality of stationary blades or straightening vanes 86 are attached to the shaft 62 between the sets of impeller blades. As shown, the assembly 80 comprises a two-stage axial flow impeller; however, it should be understood several sets of impeller blades and straightening vanes may be employed to provide a variable number of stages, the number needed being dependent upon the fluid environment and the application conditions.

Conductors 88 extending through a substantially fluid-tight stoper 90 are provided for connecting an alternating current source, preferably three phase, to the stator field windings 22 for the purpose of energizing them. When these windings 22 are energized, they create a rotating magnetic field in the stator laminations 20 which in turn causes rotation of the rotor 18 by means of induced current, in a manner well known in conventional induction motors. By reversing the direction of the rotating magnetic field, the rotor will be rotated in the opposite direction.

In operation, energization of the motor causes the rotor 18 to rotate, and thus the parts associated with the rotor also rotate. These associated parts include the end rings 26 and 28, the thrust runners 38 and 40, the hollow tubes 30 and 32, and the impellers 82 and 84 attached to the hollow tubes. Rotation of the impellers draws fluid into the unit through the inlet and imparts a rotational motion to the fluid. The impellers 82 impart a rotational velocity to the fluid, which is partially recovered as static pressure when the fluid flows through the straightening vanes 86. An additional rotational velocity is imparted to the fluid as it passes through the impellers 84. As the fluid flows to the outlet end of the unit, it passes through the straightening vanes 78 which transform the fluid rotational velocity to translational velocity with a minimum of loss.

A portion of the fluid which passes through the unit 10 is used to provide the hydrodynamic film for the thrust bearings, the hydrodynamic film for supporting and positioning the rotor, and to provide a coolant material for both the electric motor and the thrust bearings. It is desirable to have the fluid which forms the hydrodynamic films to be as pure and free from particulate matter as possible, and the centrifugal force created by operation of the unit is used to achieve this purity. As was described above, operation of the unit imparts a rotational motion to the fluid therewithin. Since the fluid within the unit is rotating about the axis of rotation 24, the centrifugal forces created by such rotation force the heavier portion of the fluid outward from the axis 24 toward the walls of the rotor and tube bores. The heavier portion of the fluid is that portion which contains dirt or particulate matter. Thus, as the fluid flows through the unit, the purest fluid is that at the center or axial portion and it becomes progressively dirtier at or near the walls of the bores of the tubes 30 and 32 and the rotor 18. The centrifugal separation effect is described in greater detail in patent application Serial No. 253,233, filed Jan. 22, 1963, in the name of one of the present inventors, Watt V. Smith, wherein a centrifugal separator utilizing this effect is described.

At least one, but preferably a plurality of centrifugal separating pumps are provided for directing a portion of the clean, pure fluid from the axial portion of the unit to the various places where the fluid will be used as coolant, a lubricant, or both. Each centrifugal separation pump is in the form of a hollow cross-flow tube 92 having an inlet 94 near the axial portion of the unit. The inlet end of the pump or tube 92 is attached to a rotatable sleeve 96 which surrounds the shaft stem 64, and is axially positioned between the main shaft portion 62 and the hub member 68. The outlet or discharge end of the pump or tube 92 passes through the thrust runner 40 and exits at its outer edge. Since the thrust runner 40 is attached to the rotor 18 by means of the tube 32, rotation of the rotor causes a corresponding rotation of the thrust runner 40, and since the pump 92 and sleeve 96 are attached to the thrust runner 40, they also correspondingly rotate. Rotation of the pump 92 causes clean fluid to enter the pump inlet 94 and to flow through the pump.

Part of the fluid discharged from the pump 92 flows into the narrow annular clearance region between the rotor 18 and stator 16 wherein, due to relative rotation between the rotor and stator, a hydrodynamic fluid film is created which radially supports and positions the rotor 18 and renders it completely out of contact with the stator as the rotor and stator rotate relative to one another. Another part of the fluid discharged from the pump 92 serves to lubricate the outlet end thrust bearing 40, 44. This is accomplished by a radial groove or passageway 98 in the thrust shoe 44 which interconnects with an axial passageway, or several discrete passageways, 100 which exit at the interface between the thrust shoe 44 and the thrust runner 40. Fluid from the pump 92 flows through the passageways 98 and 100 to the interface between the thrust runner 40 and thrust shoe 44 wherein, due to the relative motion which occurs as the thrust runner 40 rotates while the thrust shoe 44 remains stationary, a hydrodynamic thrust bearing fluid film is created. As new fluid continues to be supplied under pressure, the old and spent fluid film passes back into the central flow portion of the unit wherein it mixes with the dirty portion of the fluid. Still another portion of the fluid which is discharged from the pump 92 passes over the stator windings 22 and stator core 20 by flowing through the passages formed by the spacers 14 between the casing 12 and the stator core 20. This fluid cools the stator 16 and also serves to supply lubricant to the inlet end thrust bearing 38, 42. The thrust shoe 42 is provided with a radial passageway 104 and an axial passageway 106 which serve to provide lubricant to the interface between the thrust runner 38 and the thrust shoe 42, in a manner identical to that described for the outlet end thrust bearing 40, 44.

Figure 2:
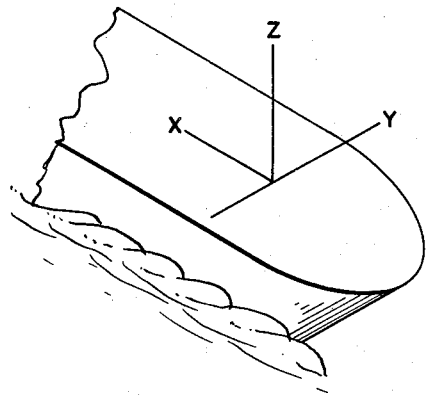
FIG. 2 is a fragmentary diagrammatic view of a marine surface vessel showing the orientation of the vessel's axes.
Figure 2A:
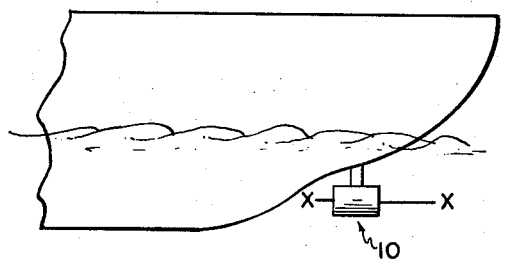
FIG. 2A, 2B and 2C are fragmentary diagrammatic views showing the unit of FIG. 1 oriented in each of the axes of FIG. 2.
Figure 2B:
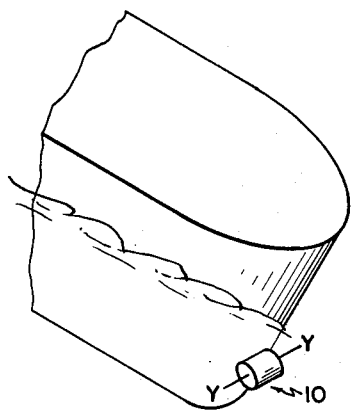
Figure 2C:
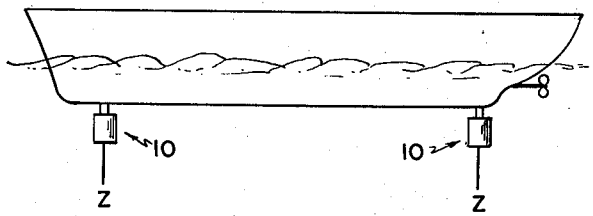
Figure 3:
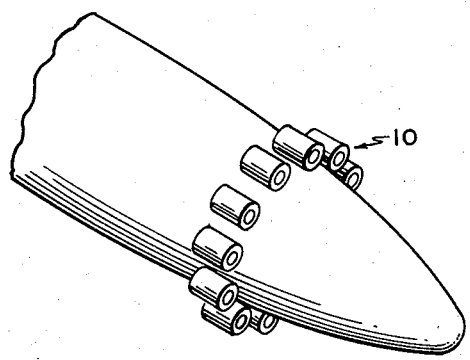
FIG. 3 is a diagrammatic view of a submarine vessel using the unit of FIG. 1 as a propulsive means.

Referring to FIG. 2, a marine surface vessel is shown having three axes; an X axis which is the longitudinal or fore-and-aft axis of the vessel, a Y axis which is the lateral or athwartships axis of the vessel, and a Z axis which is the azimuth or normal axis of the vessel. Depending upon the particular application desired, the unit 10 can be mounted with its axis 24 oriented in the plane of either the X, Y, or Z axes. Thus, FIG. 2A shows the axis 24 extending along the X axis. In this orientation, the unit serves as a propulsive means to propel the vessel. In FIG. 2B, the axis 24 of the unit extends along the Y axis. In this orientation, the unit serves to steer the vessel. Bi-directionality of steering can be achieved by reversing the magnetic field of the unit motor. In FIG. 2C, the axis 24 extends along the Z axis. In this orientation, the unit serves to support the vessel and to alter its buoyancy characteristics. FIG. 3 shows a submarine vessel having a plurality of units 10 surrounding its stern portion and providing propulsion means for propelling the submarine. It should be understood that these illustrated applications are only illustrative and that numerous other possible applications of use of the unit 10 can be envisioned without departing from the scope of the present invention.

Figure 4:
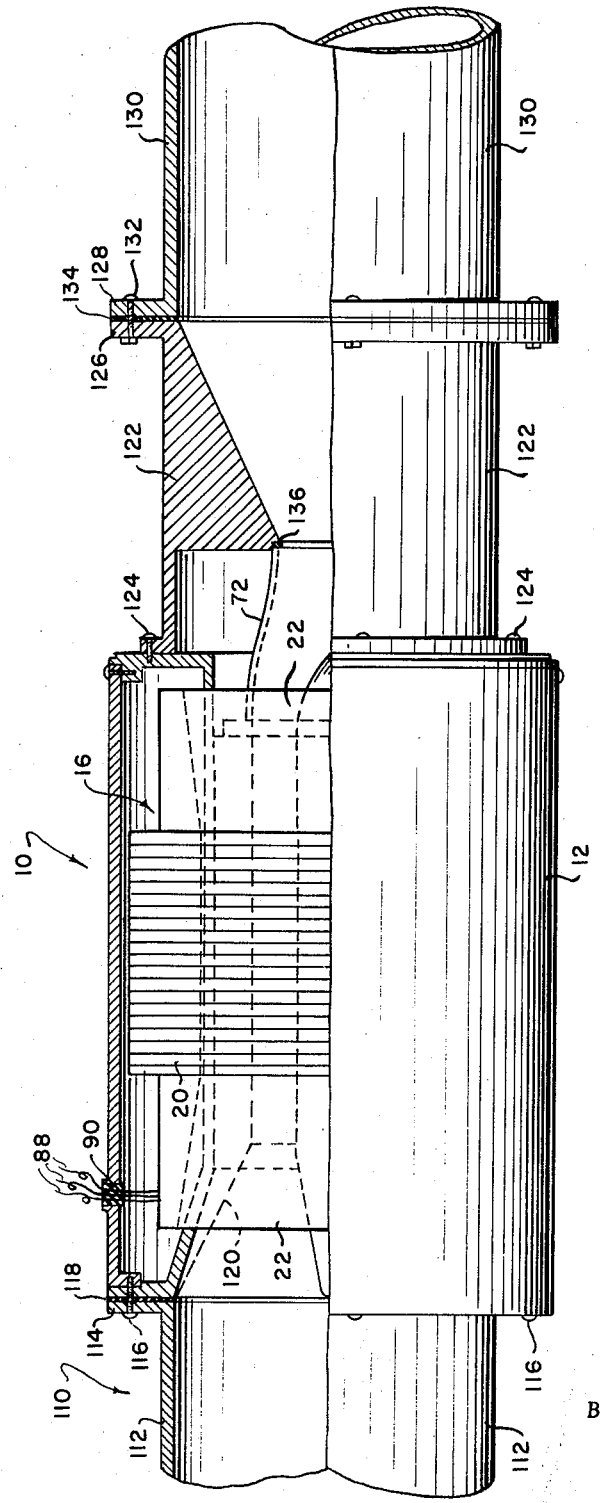
FIG. 4 is a partial sectional view of an axial flow unit, similar to that shown in FIG. 1, but restrained from movement by being mounted within a piping system and thus adapted to act as a pump.

FIG. 4 illustrates how the unit 10, with only slight modification, can be utilized as an axial flow pump in a pipeline system generally indicated as 110. A section 112 of the pipeline 110, having an annular flange portion 114, is connected to the casing 12 through the flange 50 of the end plate 46. A plurality of fastening means, such as bolts 116, interconnect the flanges 50 and 114, with a compressed gasket means 118 therebetween to provide a fluid tight seal at the unit inlet. If desired, a tapered transition structure 120 can be provided to minimize transitional losses between the pipeline 110 and the unit 10. At the outlet end of the unit 10, a transition structure 122 can be attached to the flange 52 of the end plate 48 by suitable fastening means such as bolts 124. The transition structure has an annular flange 126 which is interconnected to the annular flange 128 of a section 130 of the pipeline 110 by suitable fastening means such as bolts 132. A compressed gasket means 134 is provided between the flanges 126 and 128 to provide a fluid tight seal. If desired, a compressible gasket means 136 can be provided to seal the outlet end of the nozzle 72 to the interior of the transition structure 122. It should be noted that the only essential modification which need be made to the device of FIG. 1 to adapt it to the use of FIG. 4 is to remove the cowlings 70 and 76.

It can thus be seen that the unit of the present invention provides a device which, in operation, creates clean hydrodynamic films of the ambient fluid being propelled through the device, which films eliminate frictional contact between the rotating parts, and thus increase the efficiency of the device. Also, this lack of frictional contact, coupled with the coating and encapsulation of the motor laminations which reduces vibrations, tends to provide a device which operates with relative silence. This silent operation proves especially valuable in subaqueous applications where noise is often a critical factor.

It will be understood that various changes in the details, materials, steps and arrangement of parts, which have been herein described and illustrated in order to explain the nature of the invention, may be made by those skilled in the art within the principle and scope of the invention as defined in the appended claims.

What is claimed is:
1. An axial flow unit comprising:
 a casing having an inlet end and an outlet end;
 motor means mounted within said casing means and including a rotor member and a stator member;
 said rotor member having a central bore therethrough concentric about the unit axis which extends between said inlet and outlet ends of said casing;
 said central bore in said rotor member defining an inner peripheral wall therein;
 a central shaft extending along the unit axis and being connected to said casing means to prevent relative rotation therebetween;
 a plurality of sets of impeller blades longitudinally spaced within and connected to said inner peripheral wall of said rotor member;
 each blade extending radially inwardly from said in- ner peripheral wall and terminating adjacent to, but spaced from, said central shaft;

at least one set of straightening vanes disposed on the outlet side of each set of impeller blades;

each vane being connected to said central shaft, extending radially outwardly therefrom, and terminating adjacent to, but spaced from, the inner peripheral wall of said rotor member;

each set of impeller blades and straightening vanes defining a transfer stage;

electrical means for energizing said motor means to cause rotor rotation which in turn causes impeller rotation;

whereby, when the unit is immersed in or placed adjacent a body of fluid, and the electrical means are energized causing rotor rotation, the fluid will be drawn through the unit in a plurality of stages, each set of impeller blades imparting additional velocity to said fluid and each set of straightening vanes transforming any rotational velocity of said fluid into translational velocity.

2. An axial flow unit capable of being totally submerged in a non-compressible fluid and of transferring such fluid axially through said unit along the central axis thereof; said unit comprising:

a casing means including an inlet and an outlet aligned along an axis which defines the central axis of the unit;

an electric motor mounted within said casing means and including a rotor member and a stator member;

said stator member being affixed to the interior of said casing and having a central cylindrical bore therein which is concentric about the unit central axis which defines an axis of rotation;

said rotor member having a cylindrical outer surface and a central cylindrical bore, both coaxial with and concentric about the axis of rotation, said rotor outer surface being diammetrically slightly smaller than said stator bore to thereby permit said rotor member to be freely mounted within said stator bore leaving a small annular space between said rotor and stator members;

hollow elongated cylindrical tube means mounted within and coaxial with said rotor bore and affixed to the walls thereof for carrying a plurality of impellers therewithin whereby rotor rotation causes corresponding rotation of said tube means;

a plurality sets of impellers affixed to the inner walls of said tube means longitudinally spaced from one another;

an axial shaft extending through said unit and being atached to said casing to prevent shaft rotation;

a plurality of sets of straightening vanes affixed to said axial shaft each set of straightening vanes being located adjacent a set of said impellers;

power supply means for energizing said electric motor for rotation of said rotor, said hollow tube means, and said impellers;

said impeller rotation drawing ambient fluid in through said inlet and imparting an increased axial and rotational velocity to said fluid and directing said fluid to said straightening vanes;

said straightening vanes converting the fluid rotational velocity to an increased axial velocity and pressure whereby the fluid exits from said unit outlet at an increased velocity and pressure thus producing a propulsive thrust axially in the direction toward said inlet.

3. An axial flow unit as defined in claim 2 but further characterized by a nozzle at said unit outlet for maximizing said fluid discharge velocity.

4. An axial flow unit as defined in claim 2 but further characterized by a pair of thrust bearings located adjacent opposite ends of the rotor member to counteract axial thrust.

5. An axial flow unit as defined in claim 4 but further characterized by means for directing and distributing a portion of the fluid from the axial portion of the unit to the annular space between the rotor and stator wherein, due to relative rotation, a hydrodynamic fluid film is created to radially support and position said rotor, and for directing and distributing another portion of the fluid from the axial portion of the unit to the thrust bearings wherein, due to relative rotation, a hydrodynamic fluid film is created to axially support and position said rotor.

6. An axial flow device for transferring liquid at increased pressure and velocity therethrough along the central axis of the device, said device comprising:

a casing means having an inlet and an outlet axially aligned along an axis which defines the central axis of the device;

an electric motor in spaced juxtaposition to said casing and including a rotor and stator member;

said stator member being affixed in spaced relation to the inner walls of said casing means and having a central cylindrical bore concentric about the central axis;

said rotor member having a cylindrical outer surface and a central cylindrical bore, both coaxial with and concentric about said central axis, said rotor outer surface being diametrically slightly smaller than said stator bore to thereby permit said rotor member to be freely mounted within said stator bore leaving a small annular space between said rotor and stator members;

a pair of thrust runners affixed to opposite ends of said rotor member;

a pair of perforate end plates provided at opposite ends of the device and having apertures therein forming the inlet and outlet openings;

a pair of thrust shoes non-rotatably mounted one within each end plate and being located adjacent said thrust runners, each thrust shoe and its mating thrust runner defining a thrust bearing which compensates for axial forces within said device;

hollow elongated cylindrical tube means disposed coaxially within said rotor bore and attached to said thrust runners, thus being affixed to said rotor member and rotatable therewith;

an axial shaft extending through said device and being attached to at least one of said end plates to prevent rotation thereof;

at least one liquid transfer stage within said device, each stage including a plurality of impellers affixed to the inner walls of said tube means and a plurality of straightening vanes affixed to the exterior of said axial shaft;

power supply means for electrically energizing said electric motor for rotation of said rotor and the hollow tube means, impellers, and thrust runners affixed to said rotor;

said rotor rotation causing liquid to flow axially through the transfer stages of said device, and also causing centrifugal force which separates the dirt from liquid flowing through the device and moves the dirt radially outward from the central axis toward the walls of said tube means thus leaving pure clean liquid at the axial region;

means for directing and distributing a first portion of said pure clean liquid to the annular space between rotor and stator wherein a hydrodynamic liquid film is created due to relative rotation, a second portion of said clean pure liquid to said thrust bearings wherein a hydrodynamic liquid film is created due to relative rotation, and a third portion of said clean pure liquid to surround said stator member to cool the same;

a nozzle affixed to said outlet end plate adjacent the outlet aperture; and outlet straightening vanes affixed to the interior of said nozzle for transforming the rotational velocity of the liquid transferred through the device into translational velocity.

7. An axial flow device as defined in claim 6 but further characterized by cowling means at each end of the device to minimize flow losses around the exterior of the device as it moves through said liquid.

8. An axial flow device as defined in claim 6 but further characterized by means at each end of the device for connecting said device axially between two pipes in a pipeline system wherein said device functions as an axial flow pump to increase the pressure and velocity of liquid flowing through said pipeline system.

9. An axial flow device as defined in claim 6 wherein said rotor and stator members are encapsulated in a resinous material which renders them impervious and inert to the deleterious effects of the liquid which flows through the device.

10. An axial flow device as defined in claim 6 wherein the annular space between said rotor and stator members has a radial dimension of between 0.001 and 0.003 inch per inch of rotor diameter.

11. An axial flow device as defined in claim 6 wherein the thrust shoes are mounted within the end plates by means of a plurality of elastic elements which prevent said thrust shoes from rotating about said central axis while permitting them to move angularly thereabout.

References Cited in the file of this patent

UNITED STATES PATENTS

| | | |
|---|---|---|
| 2,312,848 | Pezzillo | Mar. 2, 1943 |
| 2,537,310 | Lapp | Jan. 9, 1951 |

FOREIGN PATENTS

| | | |
|---|---|---|
| 1,099,019 | France | Aug. 29, 1955 |
| 250,177 | Great Britain | July 8, 1926 |
| 272,374 | Switzerland | Dec. 15, 1950 |